(12) United States Patent
Casci et al.

(10) Patent No.: US 8,017,544 B2
(45) Date of Patent: Sep. 13, 2011

(54) CATALYST MANUFACTURE

(75) Inventors: John Leonello Casci, Cleveland (GB); Alejandro Martin Antonini, Cleveland (GB)

(73) Assignee: Johnson Matthey PLC, London (GB)

( * ) Notice: Subject to any disclaimer, the term of this patent is extended or adjusted under 35 U.S.C. 154(b) by 70 days.

(21) Appl. No.: 11/914,428

(22) PCT Filed: May 9, 2006

(86) PCT No.: PCT/GB2006/050095
§ 371 (c)(1),
(2), (4) Date: Nov. 14, 2007

(87) PCT Pub. No.: WO2006/123179
PCT Pub. Date: Nov. 23, 2006

(65) Prior Publication Data
US 2008/0207436 A1   Aug. 28, 2008

(30) Foreign Application Priority Data

May 20, 2005   (GB) .................................. 0510316.3

(51) Int. Cl.
*B01J 27/25*   (2006.01)
*B01J 23/75*   (2006.01)

(52) U.S. Cl. ......... 502/201; 502/200; 502/325; 502/326

(58) Field of Classification Search .................. 502/200, 502/201
See application file for complete search history.

(56) References Cited

U.S. PATENT DOCUMENTS

| | | | | |
|---|---|---|---|---|
| 4,717,702 A | * | 1/1988 | Beuther et al. | 502/303 |
| 5,863,856 A | * | 1/1999 | Mauldin | 502/325 |
| 2003/0211940 A1 | * | 11/2003 | Van Berge et al. | 502/325 |
| 2004/0214904 A1 | | 10/2004 | Singleton et al. | |

FOREIGN PATENT DOCUMENTS

| | | |
|---|---|---|
| EP | 0 434 284 B1 | 8/1994 |
| WO | WO-02/089978 A1 | 11/2002 |
| WO | WO-2004/028687 A1 | 4/2004 |

OTHER PUBLICATIONS

M. Alderliesten, "A Nomenclature for Mean Particle Diameters," *Standardisation in Particle Sizing*, May 1984, pp. 167-172.

* cited by examiner

*Primary Examiner* — Elizabeth D Wood
(74) *Attorney, Agent, or Firm* — RatnerPrestia

(57) ABSTRACT

A method is described for lowering the nitrate content in a cobalt catalyst precursor formed by impregnating a catalyst support with cobalt nitrate, comprising calcining the impregnated support in air to effect partial denitrification and subsequently heating the calcined impregnated support to a temperature below 250° C. in the presence of a gas mixture comprising 0.1-10% hydrogen by volume in an inert gas.

20 Claims, No Drawings

CATALYST MANUFACTURE

FIELD OF THE INVENTION

This invention relates to methods for manufacturing catalysts and in particular to the manufacture of cobalt catalysts from cobalt-nitrate-impregnated catalyst supports.

BACKGROUND OF THE INVENTION

Preparation of supported cobalt catalysts suitable for hydrogenation reactions or the Fischer-Tropsch synthesis of hydrocarbons has typically been by impregnation of soluble cobalt compounds into 'pre-formed' oxidic support materials or by precipitation of cobalt compounds from solution in the presence of support powders or extrudates, followed by a heating step in air and then, prior to use, activation of the catalyst by reduction of the resulting cobalt compounds in the catalyst precursors to elemental, or 'zero-valent' form typically using a hydrogen-containing gas stream. The heating in air converts at least some of the cobalt compounds to cobalt oxide, $Co_3O_4$. The subsequent reduction with hydrogen converts the $Co_3O_4$ to cobalt monoxide, CoO, and thence the catalytically active cobalt metal.

Impregnation methods typically rely on cobalt nitrate as it is relatively easy to manufacture at low cost. It is necessary, however, to reduce the residual nitrate ($NO_3$) level in the catalysts to very low levels to prevent emissions of nitrogen-oxide (NOx) gases to the environment during subsequent processing. Whereas NOx abatement technology, e.g. NOx scrubbing, is commonly provided for calcination of nitrate-containing catalyst precursors, it is usually absent from catalyst reduction equipment. Furthermore, installing NOx abatement technology is generally not practical where catalyst precursors are to be reduced to the active form in-situ, e.g. in a hydrogenation or Fischer-Tropsch reactor. However, we have found that in order to reduce the nitrate content of the catalyst precursor to acceptably low levels in the final catalyst precursor during the heating step in air, it is necessary to heat the precursor in air to temperatures in excess of 500° C. Prolonged heating of the catalyst precursor at these high temperature has been found to reduce the resulting cobalt surface area of the subsequently reduced catalysts, possibly as a result of increased support-metal interactions leading to undesired formation of spinel or other complex oxides. For example, heating cobalt compounds supported on alumina in air can increase cobalt aluminate formation. In the subsequent catalyst activation, cobalt aluminate is more resistant to reduction with hydrogen than cobalt oxide, requiring prolonged reduction times or increased temperatures. Both of these can lead to reduced cobalt surface areas in the resulting catalysts. As cobalt surface area has been found to be proportional to catalyst activity, a method for the preparation of the catalyst precursor at lower temperatures, but which also reduces nitrate levels to low levels is desirable.

SUMMARY OF THE INVENTION

Accordingly the invention provides a method for lowering the nitrate content in a cobalt catalyst precursor formed by impregnating a catalyst support with cobalt nitrate, comprising calcining the impregnated support in air to effect partial denitrification and subsequently heating the calcined impregnated support to a temperature below 250° C. in the presence of a gas mixture comprising 0.1-10% hydrogen by volume in an inert gas.

The method reduces nitrate content of the precursor to low levels without causing any reduction of the cobalt to elemental, or 'zero-valent', metallic form. By "without causing any reduction" we mean that the cobalt is not substantially reduced to metallic form, i.e. <1%, preferably <0.5%, more preferably <0.05% of the cobalt is reduced. Consequently the precursor is safe to handle. Nor is there we believe any conversion of $Co_3O_4$ to CoO and so possible re-oxidation of CoO is avoided.

DETAILED DESCRIPTION OF THE INVENTION

The method of the present invention is performed on an impregnated catalyst support. Impregnation methods for producing cobalt catalysts are well known and generally comprise combining a catalyst support with a solution of cobalt nitrate, e.g. cobalt (II) nitrate hexahydrate at a suitable concentration. For example, an incipient wetness technique may be used whereby sufficient cobalt solution to fill up the pores of the support material added to the catalyst support. Alternatively larger amounts of cobalt solution may be used if desired. Whereas a number of solvents may be used such as water, alcohols, ketones or mixtures of these, preferably the support has been impregnated using aqueous solutions of cobalt nitrate. Single or multiple impregnations may be performed to achieve a desired cobalt level in the catalyst precursor.

The support material may comprise alumina, silica (including both synthetic silica and naturally occurring forms of silica such as kieselguhr), alumino-silicate, titania, zirconia, carbon or other suitable support such as zinc oxide. The support may comprise one or more of these, for example the support may be an aluminosilicate, a titania-coated silica or alumina, or a zirconia-coated silica or alumina. Preferably an alumina support is present, which is most preferably a transition alumina, so that preferred catalysts according to the invention comprise a cobalt species on a transition alumina support. Suitable transition alumina may be of the gamma-alumina group, for example a eta-alumina or chi-alumina. These materials may be formed by calcination of aluminium hydroxides at 400 to 750° C. and generally have a BET surface area in the range 150 to 400 $m^2/g$. Alternatively, the transition alumina may be of the delta-alumina group which includes the high temperature forms such as delta- and theta-aluminas which may be formed by heating a gamma group alumina to a temperature above about 800° C. The delta-group aluminas generally have a BET surface area in the range 50 to 150 $m^2/g$. The transition aluminas contain less than 0.5 mole of water per mole of $Al_2O_3$, the actual amount of water depending on the temperature to which they have been heated. Alternatively, the catalyst support may comprise alpha-alumina.

The catalyst of the invention is particularly suitable for use in Fischer-Tropsch (F-T) hydrocarbon synthesis and the supports preferred for cobalt catalysts for use in known cobalt F-T catalysts may be advantageously used for the catalysts of the present invention.

The support may be in the form of a powder or of a shaped unit such as a granule, tablet or extrudate. Shaped units may be in the form of elongated cylinders, spheres, lobed or fluted cylinders or irregularly shaped particles, all of which are known in the art of catalyst manufacture. Alternatively the support may be in the form of a coating upon a structure such as a honeycomb support, monolith etc. Support materials may themselves contain promoters, stabilisers or other materials such as binders and may be treated prior to use in the process of the invention, e.g. by spray drying and/or calcining.

A suitable powder for the catalyst support generally has a surface-weighted mean diameter D[3,2] in the range 1 to 200 μm. In certain applications such as for catalysts intended for use in slurry reactions, it is advantageous to use very fine particles which have a surface-weighted mean diameter D[3,2] on average, in the range from 1 to 20 μm, e.g. 1 to 10 μm. For other applications e.g. as a catalyst for reactions carried out in a fluidised bed, it may be desirable to use larger particle sizes, preferably in the range 50 to 150 μm. The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167-172, and is calculated from the particle size analysis which may conveniently be effected by laser diffraction for example using a Malvern Mastersizer.

If desired, the impregnated support may be pre-dried to remove solvent prior to calcination and treatment with the hydrogen/inert gas mixture. The pre-drying step may be performed at 20-120° C., preferably 95-110° C., in air or under an inert gas such as nitrogen, or in a vacuum oven.

The cobalt nitrate impregnated catalyst precursor is heated in air to effect partial denitrification. The heating step, also termed herein as calcination, causes a physiochemical change in the impregnated support whereby the cobalt nitrate is at least partially decomposed to cobalt oxide, $Co_3O_4$, with evolution of NOx gases. The calcination temperature is preferably in the range 130 to 500° C. but the maximum calcination temperature is preferably ≦400° C., more preferably ≦350° C., most preferably ≦300° C., especially ≦250° C. to minimize cobalt-support interactions. The calcination time is preferably ≦24, more preferably ≦16, most preferably ≦8, especially ≦6 hours. The calcination is most preferably performed ≦250° C. for ≦2 hours.

The cobalt content of the calcined impregnated support is preferably ≧5% by weight, more preferably ≧15% by weight. The upper limit may be 40% by weight.

The amount of nitrate present in the impregnated support depends on the amount of cobalt nitrate actually impregnated, i.e. is proportional to the cobalt content of the impregnated support. The calcination step preferably removes >50%, more preferably >75%, most preferably >90% of the nitrate originally present from the impregnated support. For example, where the cobalt content of the calcined impregnated support is about 20% wt, we have found that the residual nitrate content of the calcined impregnated support, expressed as $NO_3$ by weight, prior to treatment with the hydrogen-containing gas is >1% wt, often 3 to 7% wt depending on the calcination conditions. (At 20% wt Co in the reduced catalyst, the impregnated support prior to the calcination step will have comprised about 30% wt $NO_3$). In the present invention, calcination is preferably operated such that the catalyst precursor contains nitrate levels in the range 1-10%, more preferably 1-5%. Residual nitrate levels >1% wt pose a considerable problem during the subsequent reduction stage, in particular where the reduction is carried out in-situ in a hydrogenation or Fischer-Tropsch reactor.

Methods for measuring the nitrate content include reduction to ammonia using Devarda's alloy followed by distillation and titration, or dissolution into water and measurement with a calibrated ion-selective electrode. The preferred method is measurement by calibrated ion selective electrode.

To reduce the nitrate levels to tolerable levels, the calcined impregnated support, after cooling, is then heated to a temperature below 250° C., preferably below 225° C., especially ≦200° C. in the presence of a gas mixture comprising 0.1-10% hydrogen by volume in an inert gas, to effect further denitrification of the catalyst support. Preferably the temperature to which the calcined impregnated support is heated is >50° C., more preferably >100° C., especially >140° C. The inert gas may be any suitable inert gas such as nitrogen, helium and argon and one or more inert gases may be used. Preferably the inert gas is nitrogen. The hydrogen concentration in the inert gas is 0.1-10% by volume, preferably 1-5% by volume. It is possible to increase or reduce the hydrogen concentration in the inert gas within these limits during the denitrification step. The gas pressure during denitrification may suitably be from 1-50, preferably 1-20, more preferably 1-10 bar abs. The time for which the support is heated in the presence of the gas mixture will depend on a number of factors including the cobalt (and hence nitrate) content. The denitrification process may be operated for ≦24 hours, preferably ≦16 hours, more preferably <8 hours, especially ≦6 hours. Most preferably the catalyst precursor is heated at 140-225° C. for 1-8 hours, especially to about 200° C. for 1-3 hours. Preferably a stream of the gas mixture is passed over and/or through the calcined impregnated support. The gas hourly space velocity (GHSV) of the hydrogen/inert gas stream may be 50-4000 $hr^{-1}$, but is preferably 50-1000 $hr^{-1}$, more preferably 100-500 $hr^{-1}$ at normal temperature and pressure (NTP). Under these conditions essentially no reduction of the cobalt oxide takes place. Premature reduction is undesirable as it would pose handing problems for the resulting catalyst precursor.

The pre-drying and/or denitrification may be carried out batch-wise or continuously, depending on the availability of process equipment and/or scale of operation.

The treatment of the calcined impregnated support with the hydrogen-containing gas preferably further reduces the nitrate content by >50%, more preferably >75%. For example, a calcined impregnated support having a nitrate content of >1% wt preferably has <0.5% wt, preferably <0.25% wt, most preferably <0.1% wt residual nitrate content after treatment with the 0.1-10% vol hydrogen-containing gas.

The catalyst precursor may in addition to cobalt, further comprise one or more suitable additives or promoters useful in hydrogenation reactions and/or Fischer-Tropsch catalysis. For example, the catalysts may comprise one or more additives that alter the physical properties and/or promoters that effect the reducibility or activity or selectivity of the catalysts. Suitable additives are selected from compounds of metals selected from molybdenum (Mo), copper (Cu), iron (Fe), manganese (Mn), titanium (Ti), zirconium (Zr), lanthanum (La), cerium (Ce), chromium (Cr), magnesium (Mg) or zinc (Zn). Suitable promoters include rhodium (Rh), iridium (Ir), ruthenium (Ru), rhenium (Re), nickel (Ni), platinum (Pt) and palladium (Pd). Preferably one or more promoters selected from Ni, Pt, Pd, Ir, Re or Ru are included in the catalyst precursor. Additives and/or promoters may be incorporated into the catalyst precursor by use of suitable compounds such as acids, e.g. perrhenic acid, chloroplatinic acid, metal salts, e.g. metal nitrates or metal acetates, or suitable metal-organic compounds, such as metal alkoxides or metal acetylacetonates. Typical amounts of promoters are 0.1-10% metal by weight on cobalt. If desired, the compounds of additives and/or promoters may be added in suitable amounts to the cobalt nitrate solutions. Alternatively, they may be combined with the catalyst precursor before or after drying/denitrification.

To render the catalyst catalytically active for Fischer-Tropsch or hydrogenation reactions, at least a portion of the cobalt oxide may be reduced to the metal. Reduction is preferably performed using hydrogen-containing gasses at elevated temperature.

Before the reduction step, the catalyst precursor may, if desired, be formed into shaped units suitable for the process for which the catalyst is intended, using methods known to those skilled in the art.

Reduction may be performed by passing a hydrogen-containing gas such as hydrogen, synthesis gas or a mixture of hydrogen with nitrogen or other inert gas over the oxidic composition at elevated temperature, for example by passing the hydrogen-containing gas over the catalyst precursor at temperatures in the range 300-600° C. for between 1 and 16 hours, preferably 1-8 hours. Preferably the reducing gas comprises hydrogen at >25% vol, more preferably >50% vol, most preferably >75%, especially >90% vol hydrogen. Reduction may be performed at ambient pressure or increased pressure, i.e. the pressure of the reducing gas may suitably be from 1-50, preferably 1-20, more preferably 1-10 bar abs. Higher pressures >10 bar abs may be more appropriate where the reduction is performed in-situ.

Catalysts in the reduced state can be difficult to handle as they can react spontaneously with oxygen in air, which can lead to undesirable self-heating and loss of activity. Consequently reduced catalysts suitable for hydrogenation reactions are preferably passivated following reduction with an oxygen-containing gas, often air or oxygen in carbon dioxide and/or nitrogen. For catalysts suitable for Fischer-Tropsch processes, passivation is not preferred and the reduced catalyst is preferably protected by encapsulation of the reduced catalyst particles with a suitable barrier coating. In the case of a Fischer-Tropsch catalyst, this may suitably be a FT-hydrocarbon wax. Alternatively, the catalyst can be provided in the oxidic unreduced state and reduced in-situ with a hydrogen-containing gas.

Whichever route is chosen, the cobalt catalysts prepared from precursors obtained by the method of the present invention provide high metal surface areas per gram of reduced metal. For example, the cobalt catalyst precursors, when reduced by hydrogen at 425° C., preferably have a cobalt surface area of $\geq 20$ m$^2$/g of cobalt as measured by H$_2$ chemisorption at 150° C. More preferably the cobalt surface area is $\geq 30$ m$^2$/g cobalt and most preferably $\geq 40$ m$^2$/g cobalt. Preferably, in order to achieve a suitable catalyst volume in hydrogenation and or Fischer-Tropsch processes, the catalysts have a cobalt surface area/g catalyst $\geq 10$ m$^2$/g catalyst, more preferably $\geq 15$ m$^2$/g catalyst.

The cobalt surface area may be determined by H$_2$ chemisorption. A preferred method, used in the Examples, is as follows; Approximately 0.2 to 0.5 g of sample material, e.g. catalyst precursor, is firstly degassed and dried by heating to 140° C. at 10° C./min in flowing helium and maintaining at 140° C. for 60 minutes. The degassed and dried sample is then reduced by heating it from 140° C. to 425° C. at a rate of 3° C./min under a 50 ml/min flow of hydrogen and then maintaining the hydrogen flow at 425° C. for 6 hours. Following this reduction, the sample is heated under vacuum to 450° C. at 10° C./min and held under these conditions for 2 hours. The sample is then cooled to 150° C. and maintained for a further 30 minutes under vacuum. The chemisorption analysis is then carried out at 150° C. using pure hydrogen gas. An automatic analysis program is used to measure a full isotherm over the range 100 mm Hg up to 760 mm Hg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 mins. The analysis is then repeated to measure the physisorbed uptake. A linear regression is then applied to the "total" uptake data with extrapolation back to zero pressure to calculate the volume of gas chemisorbed (V).

Cobalt surface areas may then be calculated using the following equation;

$$\text{Co surface area} = (6.023 \times 10^{23} \times V \times SF \times A)/22414$$

where
- V=uptake of H$_2$ in ml/g
- SF=Stoichiometry factor (assumed 2 for H$_2$ chemisorption on Co)
- A=area occupied by one atom of cobalt (assumed 0.0662 nm$^2$)

This equation is described in the Operators Manual for the Micromeretics ASAP 2010 Chemi System V 2.01, Appendix C, Part No. 201-42808-01, October 1996.

The catalysts may be used for hydrogenation reactions and for the Fischer-Tropsch synthesis of hydrocarbons.

Typical hydrogenation reactions include the hydrogenation of aldehydes and nitriles to alcohols and amines respectively, and the hydrogenation of cyclic aromatic compounds or unsaturated hydrocarbons. The catalysts of the present invention are particularly suitable for the hydrogenation of unsaturated organic compounds particularly oils, fats, fatty acids and fatty acid derivatives like nitriles. Such hydrogenation reactions are typically performed in a continuous or batch-wise manner by treating the compound to be hydrogenated with a hydrogen-containing gas under pressure in an autoclave at ambient or elevated temperature in the presence of the cobalt-catalyst, for example the hydrogenation may be carried out with hydrogen at 80-250° C. and a pressure in the range 0.1-5.0×10$^6$ Pa.

The Fischer-Tropsch synthesis of hydrocarbons with cobalt catalysts is well established. The Fischer-Tropsch synthesis converts a mixture of carbon monoxide and hydrogen to hydrocarbons. The mixture of carbon monoxide and hydrogen is typically a synthesis gas having a hydrogen:carbon monoxide ratio in the range 1.7-2.5:1. The reaction may be performed in a continuous or batch process using one or more stirred slurry-phase reactors, bubble-column reactors, loop reactors or fluidised bed reactors. The process may be operated at pressures in the range 0.1-10 Mpa and temperatures in the range 150-350° C. The gas-hourly-space velocity (GHSV) for continuous operation is in the range 100-25000 hr$^1$. The catalysts of the present invention are of particular utility because of their high cobalt surface areas/g catalyst.

EXAMPLES

The invention will now be further described by reference to the following Examples.

In each of the Examples an impregnated support was prepared as follows; a gamma alumina support (Puralox 20/190 from Sasol Condea) was impregnated using a solution comprising 125.91 g of Co(NO$_3$)$_2$.6H$_2$O, 0.91 g NH$_4$ReO$_4$ and 29.4 g of demineralised water per 100 g support, to form a damp cake. This was dried on trays in an oven at 110° C. for 4 hours at a bed depth of 25 mm.

In each Example, nitrate (NO$_3$) contents were measured as follows; a known weight of sample is mixed with 50 ml demineralised water in a beaker, covered and heated to boiling for 1 minute. This is then cooled and 10 ml of 2M ammonium sulphate solution is added. This is then made up to 100 ml in a volumetric flask and the sample left for 10 minutes to settle. 75 ml are then decanted to a stirred beaker and the conductivity measured using a nitrate ion selective electrode.

The conductivity is then correlated to a calibration curve prepared using known nitrate levels to obtain the nitrate content of the sample.

In the Examples, the catalyst precursors were reduced at 425° C. using hydrogen and their cobalt surface areas determined by hydrogen chemisorption at 150° C. according to the method described above.

The cobalt contents of the reduced catalysts were all 20% by weight.

Comparative Example 1

Not According to the Invention

The dried material was calcined in air at a bed depth of 150 mm. The temperature of the powder during calcination was raised to 370° C. over 2 hours, then to 400° C. over 1.5 hours before being lowered to 270° C. over 1.5 hours.

The $NO_3$ content of the calcined catalyst precursor was 0.92% by weight. The cobalt surface area of the reduced catalyst precursor was 8.2 $m^2$/g reduced catalyst.

Thus calcination alone results in a low cobalt surface area catalyst and the nitrate content of the precursor is still ca 1% wt.

Comparative Example 2

Not According to the Invention

The dried material was calcined in air at a bed depth of 50 mm. The temperature of the powder during calcination was raised to 180° C. over 18 minutes, then to 200° C. over 10 minutes, then held at 200° C. for 10 minutes before being lowered to 130° C. over 20 minutes.

The $NO_3$ content of the calcined material was 1.8% by weight. The cobalt surface area of the reduced calcined material was 11.8 $m^2$/g reduced catalyst. This calcined material was further calcined in air using a fluidised bed using 0.4 $Nm^3$/hr air per kg oxide (SV=400 $hr^{-1}$). The temperature was raised from ambient to 200° C. over 1.5 hours and held at 200° C. for 2 hours.

The $NO_3$ content of this calcined catalyst precursor was 1.6% by weight and the cobalt surface area of the reduced material was almost unchanged at 11.6 $m^2$/g reduced catalyst. Thus lower temperature calcination, even in two steps, gives an increase in catalyst cobalt surface area but the level of residual $NO_3$ in the precursor would pose an environmental problem during reduction of the catalyst.

Example 3

According to the Invention

The dried material was calcined at a bed depth of 50 mm. The temperature of the powder during calcination was raised to 180° C. over 18 minutes, then to 200° C. over 10 minutes, then held at 200° C. for 10 minutes before being lowered to 130° C. over 20 minutes.

The $NO_3$ content of the calcined material was 1.8% by weight. The cobalt surface area of the reduced calcined material was 11.8 $m^2$/g reduced catalyst. This calcined material was further heated in a fluidised bed using 0.2 $Nm^3$/hr of 5% v/v hydrogen in nitrogen per kg oxide (SV=200 $hr^{-1}$). The temperature was raised from ambient to 200° C. over 1.5 hours and held at 200° C. for 2 hours.

The cobalt surface area of the reduced catalyst precursor prepared using this material prepared according to the invention was 11.7 $m^2$ $m^2$/g reduced catalyst, but the $NO_3$ content of the catalyst precursor was reduced markedly to 0.08% by weight. Thus the present invention provides a method whereby the nitrate content of catalyst precursors may be reduced without sacrificing cobalt surface area.

The invention claimed is:

1. A method for lowering nitrate content in a cobalt catalyst precursor comprising the steps of (i) impregnating a catalyst support with an aqueous solution of cobalt nitrate, (ii) calcining the impregnated support in air at a temperature in the range 130-500° C. to effect partial denitrification and form $Co_3O_4$ and (iii) subsequently heating the calcined impregnated support comprising $Co_3O_4$ to a temperature below 250° C. in the presence of a gas mixture comprising 0.1-10% hydrogen by volume in an inert gas to form a catalyst precursor, wherein the temperature and hydrogen content of the heating step are selected to reduce nitrate content and avoid causing any reduction of the cobalt to metallic form, and wherein the heating step (iii) is not performed in catalyst reduction equipment, a hydrogenation reactor, or a Fischer-Tropsch reactor.

2. A method according to claim 1 wherein the maximum calcination temperature is ≦400° C.

3. A method according to claim 1 wherein the heating step of the calcined impregnated support is performed at a temperature above 50° C.

4. A method according to claim 1 wherein the inert gas is nitrogen.

5. A method according to claim 1 wherein the hydrogen concentration in the inert gas is 1 to 5% by volume.

6. A method according to claim 1 wherein the pressure of the hydrogen-containing gas mixture is 1 to 50 bar abs.

7. A method according to claim 1 wherein the cobalt content of the calcined impregnated support is between 5 and 40% by weight.

8. A method according to claim 1 wherein the catalyst precursor, further comprises one or more suitable additives or promoters useful in hydrogenation reactions and/or Fischer-Tropsch catalysis.

9. A method for preparing a cobalt catalyst comprising the steps:
   (i) preparing a catalyst precursor formed by impregnating a catalyst support with an aqueous solution of cobalt nitrate, wherein the impregnated support is calcined in air at a temperature in the range 130-500° C. to effect partial denitrification and form $Co_3O_4$ and the calcined impregnated support comprising $Co_3O_4$ is subsequently heated to a temperature below 250° C. in the presence of a gas mixture comprising 0.1-10% hydrogen by volume in an inert gas to form a catalyst precursor, wherein the temperature and the hydrogen content of the heating step are selected to reduce nitrate content and avoid causing any reduction of the cobalt to metallic form,
   (ii) transferring the catalyst precursor to catalyst reduction equipment, a hydrogenation reactor, or a Fischer-Tropsch reactor and then
   (iii) reducing the catalyst precursor in a stream of hydrogen-containing gas between 300 and 600° C.

10. A method according to claim 1 wherein the maximum calcination temperature is 250° C.

11. A method according to claim 1 wherein the heating step of the calcined impregnated support is performed at a temperature between 140 and 200° C.

12. A method according to claim 1 wherein the pressure of the hydrogen-containing gas mixture is 1 to 10 bar abs.

13. A method according to claim 8 wherein the one or more suitable additives are compounds of metals selected from the group consisting of molybdenum, copper, iron, manganese, titanium, zirconium, lanthanum, cerium, chromium, magnesium and zinc.

14. A method according to claim 8 wherein the one or more suitable promoters are selected from the group consisting of rhodium, iridium, ruthenium, rhenium, nickel, platinum and palladium.

15. A method according to claim 9 wherein the reducing step is performed at a pressure of 1 to 50 bar abs.

16. A method according to claim 9 wherein the reducing step is performed at a pressure of 1 to 10 bar abs.

17. A method for lowering nitrate content in a cobalt catalyst precursor comprising the steps of (i) impregnating a catalyst support with an aqueous solution of cobalt nitrate, (ii) calcining the impregnated support in air at a temperature in the range 130-250° C. for ≦2 hours to effect partial denitrification and form $Co_3O_4$ and (iii) subsequently heating the calcined impregnated support comprising $Co_3O_4$ to a temperature in the range 50-250° C. for ≦8 hours in the presence of a gas mixture comprising 0.1-10% hydrogen by volume in an inert gas to form a catalyst precursor, wherein the time, the temperature, and the hydrogen content of the heating step are selected to reduce nitrate content and avoid causing any reduction of the cobalt to metallic form.

18. A method for lowering nitrate content in a cobalt catalyst precursor comprising the steps of (i) a single impregnation of a catalyst support with an aqueous solution of cobalt nitrate, (ii) calcining the once-impregnated support in air to effect partial denitrification and form $Co_3O_4$ and (iii) subsequently heating the calcined impregnated support comprising $Co_3O_4$ to a temperature below 250° C. in the presence of a gas mixture comprising 0.1-10% hydrogen by volume in an inert gas to form a catalyst precursor, wherein the temperature and hydrogen content of the heating step are selected to reduce nitrate content and avoid causing any reduction of the cobalt to metallic form.

19. The method of claim 17, wherein the heating step (iii) is not performed in catalyst reduction equipment, a hydrogenation reactor, or a Fischer-Tropsch reactor.

20. The method of claim 18, wherein the heating step (iii) is not performed in catalyst reduction equipment, a hydrogenation reactor, or a Fischer-Tropsch reactor.

\* \* \* \* \*